United States Patent
Mohammad Sayem et al.

(10) Patent No.: US 9,634,774 B1
(45) Date of Patent: Apr. 25, 2017

(54) DESENSE REDUCTION VIA PIN REMAP IN MODULAR DEVICE

(71) Applicant: Motorola Mobility LLC, Chicago, IL (US)

(72) Inventors: Abu Taher Mohammad Sayem, Aurora, IL (US); Mohammed Abdul-Gaffoor, Palatine, IL (US); Minh H Duong, Lake bluff, IL (US); Faisal Abedin, Lake Bluff, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/174,561

(22) Filed: Jun. 6, 2016

(51) Int. Cl.
| | |
|---|---|
| H04M 1/00 | (2006.01) |
| H04B 15/02 | (2006.01) |
| H04M 1/02 | (2006.01) |
| H04M 1/725 | (2006.01) |
| H04B 1/10 | (2006.01) |

(52) U.S. Cl.
CPC .............. *H04B 15/02* (2013.01); *H04B 1/10* (2013.01); *H04M 1/0264* (2013.01); *H04M 1/0274* (2013.01); *H04M 1/72527* (2013.01)

(58) Field of Classification Search
CPC ...................................................... H04M 1/00
USPC .................................................... 455/575.1
See application file for complete search history.

(56) References Cited

U.S. PATENT DOCUMENTS

| | | | |
|---|---|---|---|
| 8,798,694 B2 * | 8/2014 | Morishita | H01Q 1/243 455/575.3 |
| 9,391,662 B2 * | 7/2016 | Kim | H04B 1/3888 |
| 2006/0079298 A1 * | 4/2006 | Saitoh | H04M 1/0262 455/575.1 |
| 2012/0329524 A1 * | 12/2012 | Kent | G06F 3/044 455/566 |

* cited by examiner

*Primary Examiner* — Wen Huang
(74) *Attorney, Agent, or Firm* — Miller, Matthias & Hull LLP

(57) ABSTRACT

A modular device system is provided having a base portable electronic communication device. The base portable electronic communication device has a display side and a reverse side, and one or more antennas being located along one or more of the device edges. A ground element on the reverse side of the housing is adjacent to the antennas and is grounded to the chassis. A multi-pin connector array on the same side is located adjacent to the ground element and the ground element lies between the connector array and the antennas. The connector array includes multiple pins supporting multiple data speeds, and the high speed data pins are located closer to the array center than the low speed data pins. The array is configured and located to electrically connect to a mating array on a module device when the module device is mated to the base portable electronic communication device.

20 Claims, 10 Drawing Sheets

DESENSE REDUCTION VIA PIN REMAP IN MODULAR DEVICE

TECHNICAL FIELD

The present disclosure is related generally to mobile communication devices, and, more particularly, to a system and method for mitigating unwanted RF coupling, thereby reducing desensitization of radio receivers in a modular portable device system.

BACKGROUND

High-frequency electronic signals are useful with respect to increasing data rates and hence device response times. However, as data rates increase, the inventors have discovered that coupling between high-frequency lines or connectors and nearby antennas also increases. The effect is two-ways, in that signals associated with antennas may also couple into nearby high-frequency lines or connectors.

While the present disclosure is directed to a system that can eliminate certain shortcomings noted in or apparent from this Background section, it should be appreciated that such a benefit is neither a limitation on the scope of the disclosed principles nor of the attached claims, except to the extent expressly noted in the claims. Additionally, the discussion in this Background section is reflective of the inventors' own observations, considerations, and thoughts, and is not intended to catalog or summarize any item of prior art. As such, the inventors expressly disclaim this section as admitted or assumed prior art. Moreover, the identification or implication herein of a desirable course of action reflects the inventors' own observations and ideas, and therefore cannot be assumed to indicate an art-recognized desirability.

SUMMARY

In keeping with an embodiment of the disclosed principles, a modular device system is provided having a base portable electronic communication device which includes a chassis and a housing that at least partially encompassing the chassis. The base portable electronic communication device has a display side and a reverse side, and includes top, bottom and side edges, with one or more antennas being located along one or more of the edges. A ground element, e.g., a metal bar or other conductive structure, is exposed on the reverse side of the housing adjacent to the antennas and this structure is grounded to the chassis. Moreover, a multi-pin connector array on the same side is located adjacent to the ground element such that the ground element lies between the connector array and the one or more antennas. The connector array includes multiple pins supporting multiple data speeds, e.g., from low speed data to high speed data. The high speed data pins are located closer to the array center than the low speed data pins, and the array is configured and located to electrically connect to a mating array on a module device when the module device is mated to the base portable electronic communication device.

In another embodiment, a modular device connection system is provided for physically and electrically connecting an electronic module to a portable electronic communication device having one or more antennas on an edge thereof. The connection system includes a metal bar or other ground element adjacent to the antennas and grounded to the device chassis. A multi-pin connector array is located adjacent to the ground element such that the ground element lies between the connector array and the one or more antennas. The connector array includes multiple pins supporting multiple data speeds between and including low speed data and high speed data, and high speed data pins are located closer to the center than low speed data pins. The array is configured and located to electrically connect the electronic module to the portable electronic communication device.

In yet another embodiment, a modular electronic device system is provided having a portable electronic device and an electronic module. The portable electronic device has a display side and a reverse side and includes one or more antennas located along one or more of the device edges. A device ground element is exposed on the reverse side adjacent to the one or more antennas and is grounded to the chassis. The device ground element lies between a device multi-pin connector array and the one or more antennas. The connector array has multiple pins supporting multiple data speeds between and including low speed data and high speed data, and the high speed data pins are located closer to the array center than the low speed data pins.

The electronic module includes a module ground element providing a module ground and a module multi-pin module connector array. The module ground element and the module multi-pin module connector array are configured and located to electrically connect to the device ground element and the device multi-pin connector array respectively when the electronic module is mated to the portable electronic device.

Other features and aspects of embodiments of the disclosed principles will be appreciated from the detailed disclosure taken in conjunction with the included figures.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
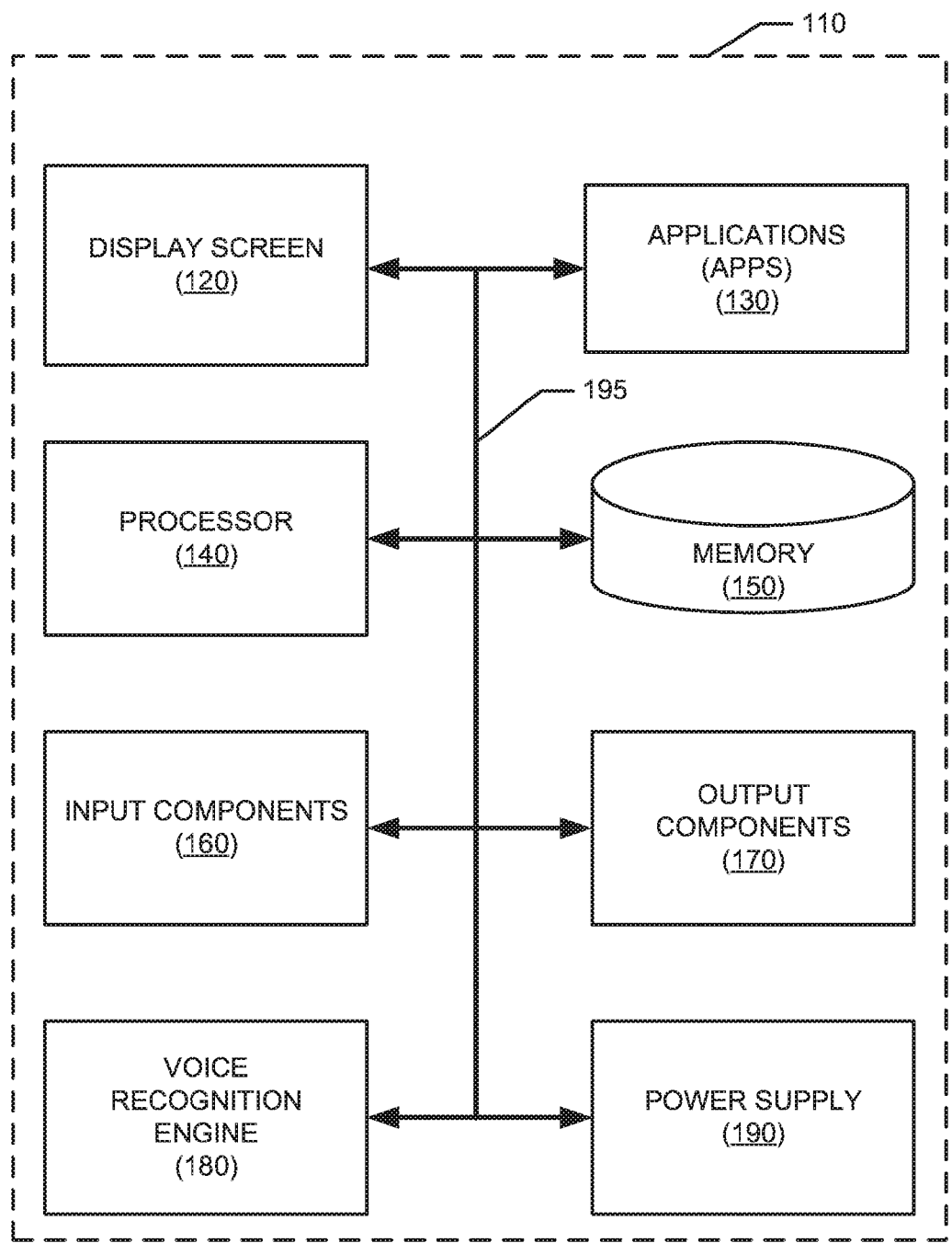
FIG. 1 is a simplified schematic of an example configuration of device components with respect to which embodiments of the presently disclosed principles may be implemented.

Before presenting a fuller discussion of the disclosed principles, an overview is given to aid the reader in understanding the later material. As noted above, Within the modular concept conceived by the inventors, an external unit ("mod" or "module") is configured to connect to a base unit (e.g., a mobile phone, tablet, or other portable processor-based electronic device) through multiple exposed connectors to enhance user experience. Modules may provide enhanced imaging, entertainment, presentation and other functionality.

It will be understood that a phone is used herein as an example of a base device, but that the base device may instead be a tablet, or other portable processor-based electronic device. The communication between the phone and the module may happen at varying speeds, from DC up to 5 Gbps or higher. These high speed connectors are in close proximity of the transmit and receive antennas of the device. Hence attaching a mod to the device may generate noise from the exposed connectors, which elevates a noise floor used to separate noise from signal, and thus may lead to desensitization of the electronic device's cellular receivers. This phenomenon may be referred to herein as "desense." In addition, interference from the cellular transmit antennas may cause the devices to throttle data transfer through the exposed mod connectors due to reverse desense.

Embodiments of the disclosed principles mitigate desensitization of the device's RF/Antenna system from unshielded high speed pin connections between phone and mod using one of multiple techniques or a combination of such techniques. In an embodiment, a ground wall is linked across the phone and the mod. This may be implemented by placing a metal bar (sometimes referred to herein as a "debar") on the phone's rear side, with the debar being tied to the reference ground on the phone's PCB (printed circuit board). The debar may extend beyond the width of the connector pin array, and in an embodiment extends outside of the width of the connector pin array by about 8 mm on either side. It will be appreciated that the length of the debar may be longer or shorter depending on specific performance and/or design features in a given instance.

The debar separates the mod connector array from the nearest antennas, e.g., the bottom antennas in one embodiment. A similar metal bar is tied to the mod's PCB. In a further embodiment, these two bars are connected to each other through an array of pogo pins (e.g., about 8 of them, although a lesser or greater number may be used depending on specific design features in a given instance. It will be appreciated that with respect to the connector array, it is not important which device includes which of the pogo pins and debar, or which contains which of the electrical connector types. As will be shown later, use of the debar system significantly reduces interference and thus reduces desense.

In another embodiment usable alone or in combination with the debar system, the individual pins of the connector pin array are mapped such that the pins carrying data with highest data rate are located closest to the center of the array and thus closest to the center of the adjacent debar. The lowest frequency pins are mapped to the outermost layer of the connector pin array, and pins of intermediate speeds are arrayed in order between the highest and lowest frequency pins. Thus, when a module is connected to the phone, high speed (noisy) lines are in the middle of the connector assembly (with highest speed lines close to the debar and with next highest speed in the middle top row) with low speed and ground pins of the connector moved outward.

Additionally, a metal plate may be placed over the connector array with holes located to allow connector pins to pass through for additional isolation. The metal plate is electrically connected via solder or conductive adhesive to the mod's PCB ground chassis, and may conductively contact the phone metal backing when the mod is attached to phone, thereby filling the non-metal gap around the connector pins with shielding metal, but not forming an overlapping ground shield into the phone (unlike USB or HDMI connectors), thereby maintaining ID integrity of the back of the phone.

With this overview in mind, and turning now to a more detailed discussion in conjunction with the attached figures, the techniques of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used.

The schematic diagram of FIG. 1 shows an exemplary component group 110 forming part of an environment within which aspects of the present disclosure may be implemented. In particular, the component group 110 includes exemplary components that may be employed in a device corresponding to the first device or phone, and the second device. It will be appreciated that additional or alternative components may be used in a given implementation depending upon user preference, component availability, price point, and other considerations.

In the illustrated embodiment, the components 110 include a display screen 120, applications (e.g., programs) 130, a processor 140, a memory 150, one or more input components 160 (user input receiver) such as speech and text input facilities, and one or more output components 170 such as text and audible output facilities, e.g., one or more speakers. In an embodiment, the input components 160 include a physical or virtual keyboard maintained or displayed on a surface of the device. In various embodiments motion sensors, proximity sensors, camera/IR sensors and other types of sensors may be used to collect certain types of input information such as user presence, user gestures and so on.

The processor 140 may be any of a microprocessor, microcomputer, application-specific integrated circuit, and like structures. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device. Such functions may include, for example, interaction among various internal components and storage and retrieval of applications and data to and from the memory 150.

Further with respect to the applications 130, these typically utilize the operating system to provide more specific functionality, such as file system services and handling of protected and unprotected data stored in the memory 150. Although some applications may provide standard or required functionality of the user device 110, in other cases applications provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation. The device 110 also includes a camera module 180, which is linked to a device camera.

In an embodiment, a power supply 190, such as a battery or fuel cell, is included for providing power to the device 110 and its components. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform certain functions. The processor 140 may include or implement various modules and execute programs for initiating different activities such as launching an application, transferring data, and toggling through various graphical user interface objects (e.g., toggling through various display icons that are linked to executable applications).

Applications and software reside on a tangible non-transitory medium, e.g., RAM, ROM or flash memory, as computer-readable instructions. The device 110, via its processor 140, runs the applications and software by retrieving and executing the appropriate computer-readable instructions.

Figure 2:
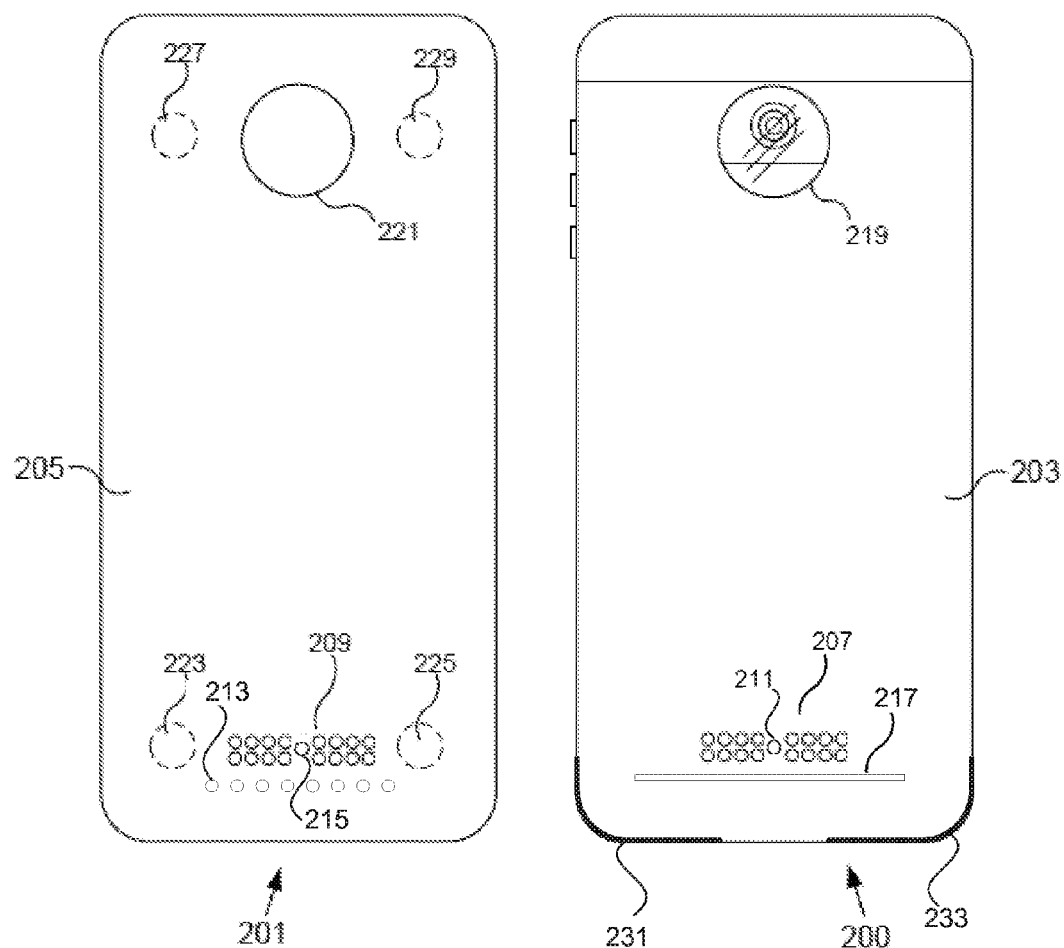
FIG. 2 is view of a first device, e.g., a mobile phone, tablet or other processor-based device, and a second device, e.g., an add-on module providing additional functionality or capabilities, showing the back of the first device and the front of the second device in accordance with an embodiment of the disclosed principles.

Turning to FIG. 2, this figure illustrates a simplified view of the phone 200 and the module 201, showing the back 203 of the phone 200 and the mating front 205 of the module 201 in accordance with an embodiment of the disclosed principles. In the illustrated example, each device 200, 201 includes a connector array 207, 209. Although each connector array 207, 209 is shown as a 16-pin connector array, it will be appreciated that other numbers of pins may be used. Although not detailed in the figure, one of the connector arrays 207, 209 will typically include spring-loaded male pins while the other 207, 209 will typically include corresponding female sockets or contacts. The phone 200 also includes one or more antennas 231, 233.

The grounded debar discussed above can be seen in FIG. 2 as element 217, and the mating pogo connectors as element 213. However, it should be appreciated that the purpose of the debar 217 and pogo connectors 213, to provide a ground wall between the connector arrays 207, 209 and the antennas 231, 233, can also be fulfilled by elements having form factors other than those illustrated. For example the debar 217 need not be continuous, and the mating element (pogo connectors 213) may be replaced with elements of different shapes, fewer elements, or even a unitary element. Moreover, it is not critical on which of the devices 200, 201 each portion of the ground wall is located. For example, using the illustrated elements, the phone 200 may include the pogo connectors 213 and the module 201 may include the debar 217.

Moreover, while solid metallic elements are shown, the ground wall may be or comprise other types of conductive materials. Various alternatives include metallic foams, conductive polymers, conductive fabrics and fibers, conductive inks and so on.

In the illustrated embodiment, an alignment socket 211 is included within the connector array 207 on the phone 200, for mating with a matching alignment pin 215 on the module 201. A third alignment point is provided by a camera protrusion 219 on the phone 200, which is configured and located to fit with a mating circular opening 221 in the module 201. In an embodiment, the camera protrusion 219 contains the main camera of the device 200 as well as one or more flash LEDs. In an embodiment, the camera protrusion 219 also includes a laser range-finder for faster focus of the main camera.

As noted above, although other camera protrusion shapes are usable and are contemplated herein, a circular shape will be used for the sake of example. Depending upon tolerances in a given implementation, a non-circular camera protrusion may provide a degree of rotational alignment as well and may limit or eliminate the need for other alignment features.

In an embodiment, a set of magnets 223, 225, 227, 229 is embedded in the front of the module 201. These magnets 223, 225, 227, 229 may be retained on an inner surface of this cosmetic sheet. These magnets may be encased in a steel shroud such that the magnetic field is focused to one side of the magnet assembly rather than extending to both sides. In an embodiment, these magnets 223, 225, 227, 229 attract the steel surface of the back 203 of the phone 200 so as to hold the devices 200, 201 together once the devices 200, 201 are in close proximity. The magnets 223, 225, 227, 229 may be of ceramic, neodymium or other type.

Figure 3:
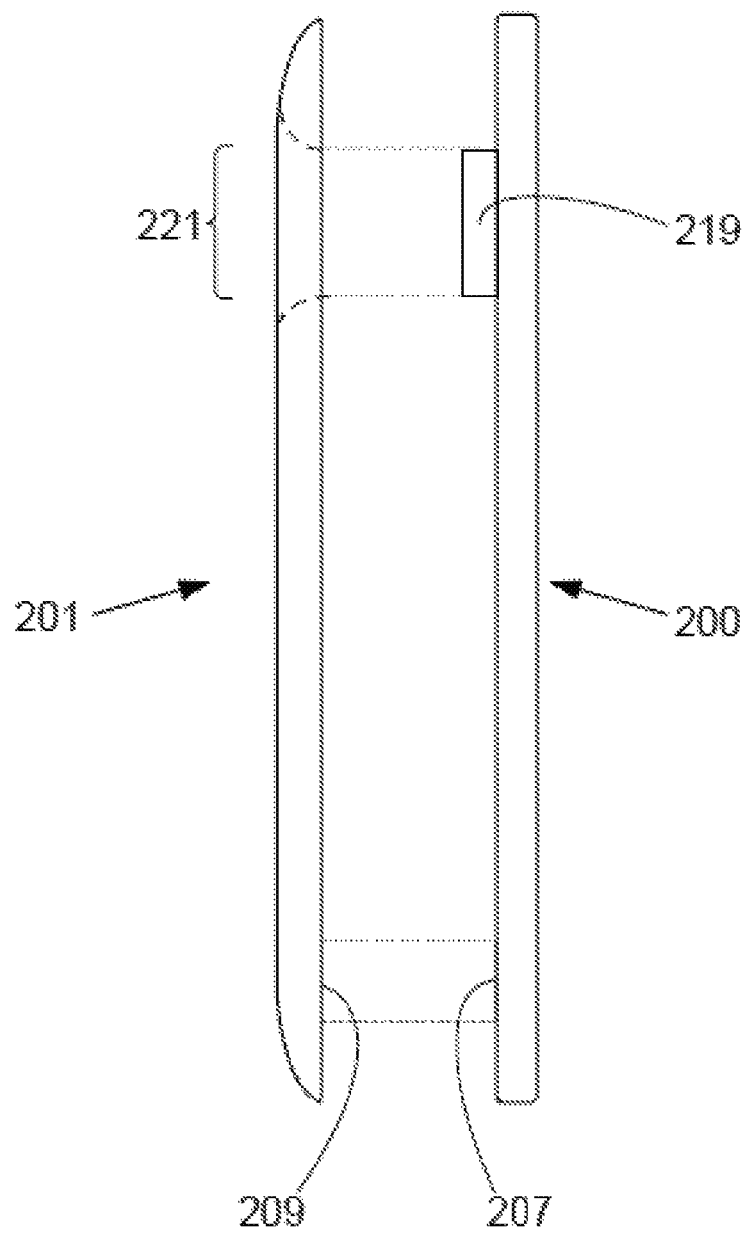
FIG. 3 is a side view of a phone and module in accordance with an embodiment of the disclosed principles.

FIG. 3 is a side view of the phone 200 and the module 201 in accordance with an embodiment of the disclosed principles. As briefly shown in the side view of FIG. 3, when the phone 200 and the module 201 are docked together, the camera protrusion 219 fits into the mating opening 221 in the module 201. In addition, the contact array 207 of the phone 200 mates with the contact array 209 of the module 201 in this configuration.

Ideally the combined device acts as one, using the connections provided by the mating contact arrays 207, 209. In particular, the contact arrays 207, 209 are used in various embodiments to exchange data, commands, power, control signals and so on.

Figure 4:
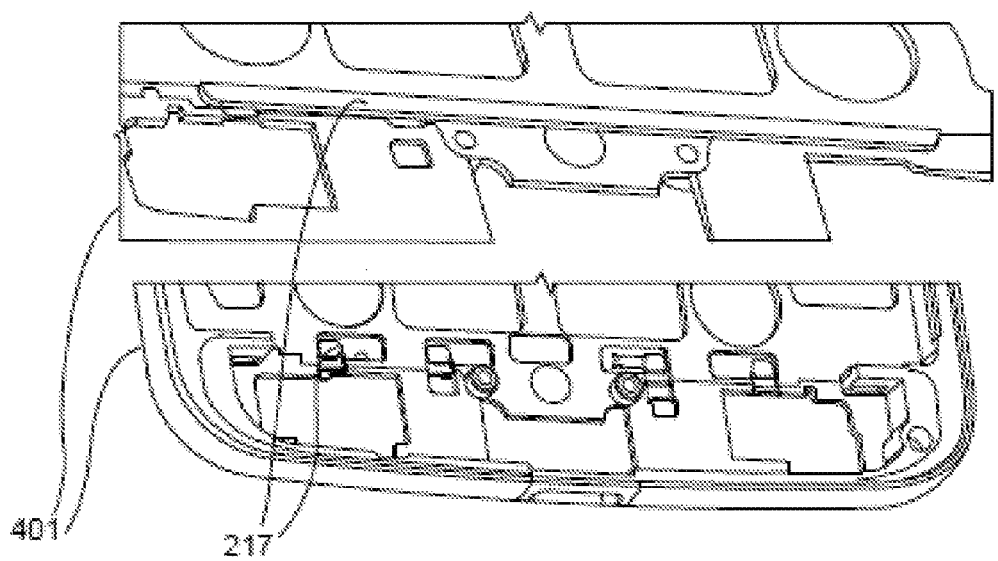
FIG. 4 is a schematic subassembly view showing a portion of the rear housing in top and bottom views in accordance with an embodiment of the disclosed principles.

FIG. 4 is a partial exploded view showing a portion of the rear housing 401 in top and bottom views, in an embodiment wherein the debar 217 is ski-booted/toed into the rear housing 401 to have multiple direct contact points grounding to the main PCB.

Figure 5:
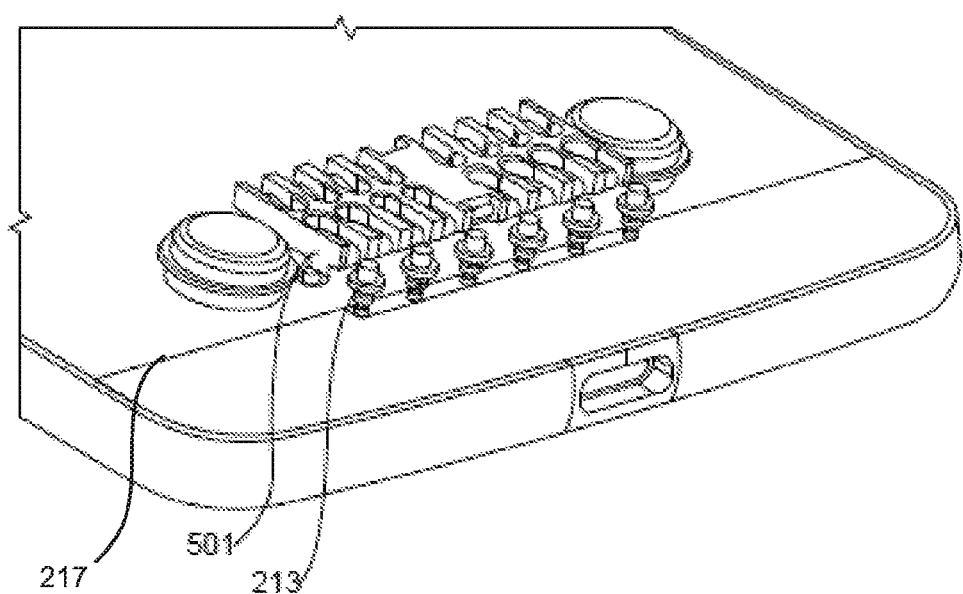
FIG. 5 is a detail view of pogo connectors and a connector array shield in accordance with an embodiment of the disclosed principles.

FIG. 5 is a detail view of the pogo connectors 213 and a connector array shroud 501 in accordance with an embodiment of the disclosed principles. As can be seen, the pogo connectors 213 are positioned to contact the debar 217 (FIG. 2) when the phone 200 and module 201 are mated together. The grounded shroud 501 partially surrounds each connector pin in the array 209 (FIG. 2), providing additional shielding.

Figure 6:
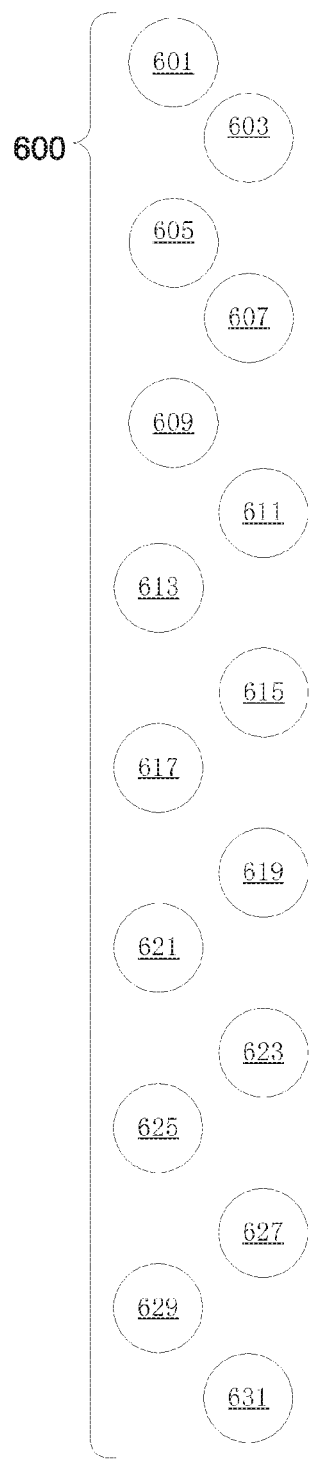
FIG. 6 is a schematic view of a group of pins in isolation for inclusion in the connector array and the mating array in accordance with an embodiment of the disclosed principles.

The schematic drawing of FIG. 6 shows several pins 600 in isolation for inclusion in the connector array 207 and the mating array 209. The pin group 600 includes pins for B+ (601), GND (x2) (603, 605), VBUS (607), CC (609), SPI CS N 12C SDA (611), SPI CLK 12C SCL (613), MPHY TXp (615), MPHY TXm (617), MPHY RXp (619), MPHY RXm (621), USB Dp (623), USB Dm (625), SPI MISO (627), SPI MOSI (629), and myDP CWIRE (631).

Figure 7:
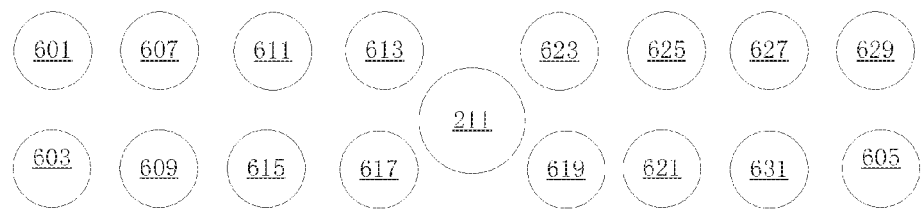
FIG. 7 is a schematic diagram showing a mapping of the pins of FIG. 6 in accordance with an embodiment of the disclosed principles.

FIG. 7 shows a mapping of the various pins 600 in an embodiment of the disclosed principles. In particular, it can be seen that the highest frequency pins (MPHY TXp (615), MPHY TXm (617), MPHY RXp (619), MPHY RXm (621)) are located centrally and in a horizontal configuration, while the grounds (GND (x2) (603, 605)), power and command pins (B+ (601), CC (609), VBUS (607)) are located outboard at the outer edges of the array. Other connectors for low speed data (SPI CS N 12C SDA (611), SPI CLK 12C SCL (613), SPI MISO (627), SPI MOSI (629)) and USB 2.-0/Mobility Display (myDP CWIRE (631), USB Dp (623), USB Dm (625)) are located either outboard or, if inboard, in the upper tier of the array, farthest from the debar. Though not necessarily to scale, the alignment socket 211 and debar 217 are shown as well in FIG. 7 in order to convey the directionality of the elements.

Figure 8:
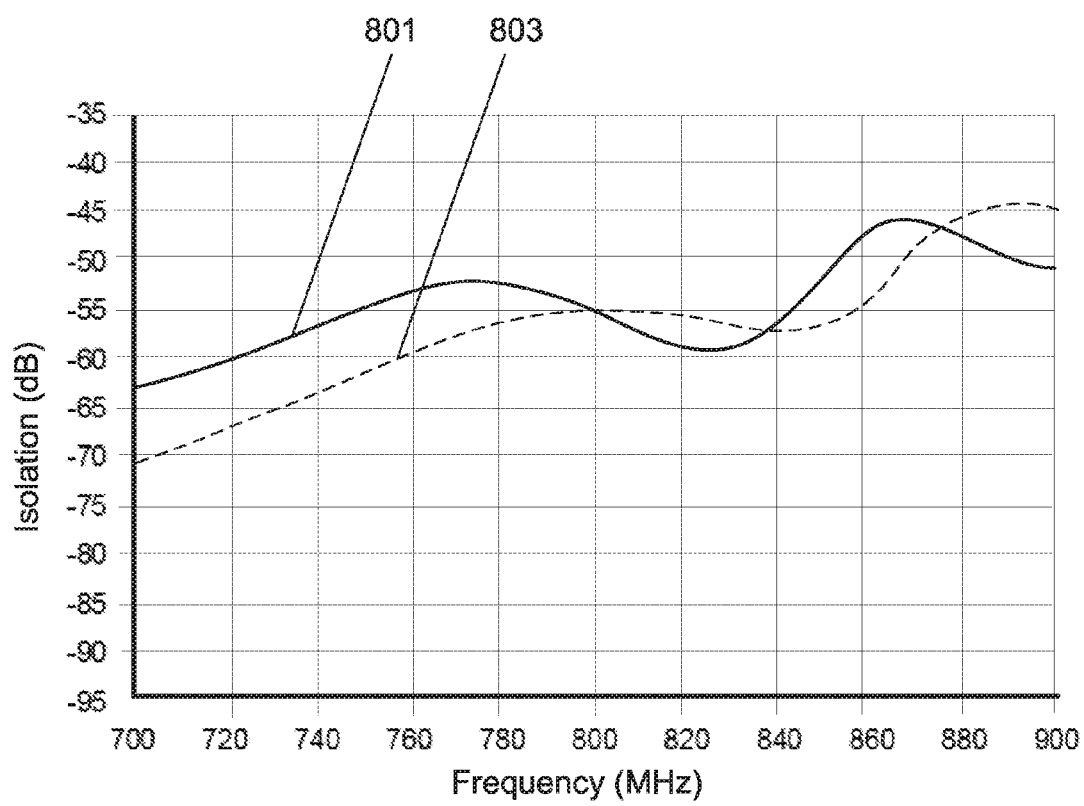
FIG. 8 is a data plot showing the isolation effect, in dB, of employing a debar, e.g., a metal bar, of 44 mm in a modular configuration in accordance with an embodiment of the disclosed principles.

As noted above, the use of a debar, as described herein or similar, can significantly increase isolation between the antennas and the pins of the connector arrays. FIG. 8 is a data plot showing the isolation effect, in dB, of employing a debar of 44 mm in a modular configuration as described herein. In particular, a first plot 801 shows the original level of isolation and a second plot 803 shows the level of isolation achieved using the debar. As can be seen, use of the debar increases isolation by more than 5 dB throughout the ultra-low band (ULB) frequency range from about 700 MHz to about 800 MHz.

Figure 9:
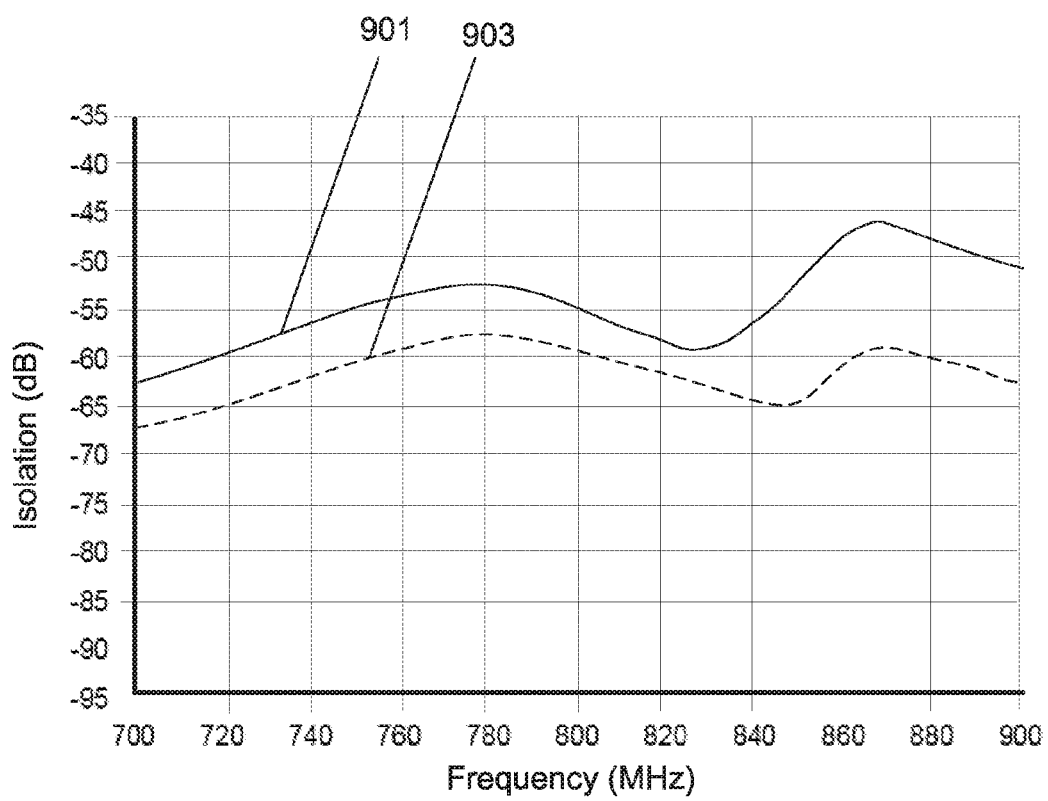
FIG. 9 is data plot showing the isolation effect, in dB, of using the pin remapping shown in FIG. 7 in accordance with an embodiment of the disclosed principles.

FIG. 9 is data plot showing the isolation effect, in dB, of using the pin remapping shown in FIG. 7. The first plot 901 shows the original level of isolation and a second plot 903 shows the level of isolation achieved using the remapping technique of placing the higher frequency pins at the lower center of the connector array. Again, the isolation effect is significant, and averages about 5 dB throughout the illustrated ULB range (700 MHz-800 MHz).

Figure 10:
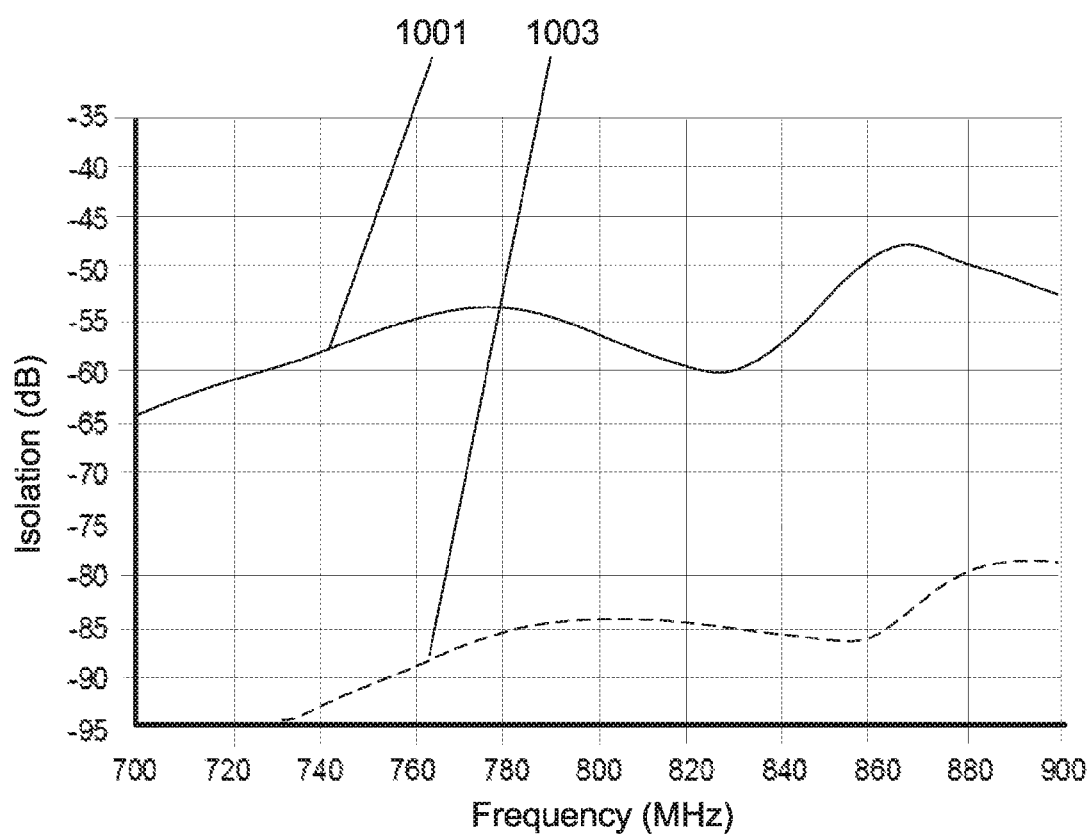
FIG. 10 is data plot showing the isolation effect of employing a debar of length 44 mm while also using the pin remapping shown in FIG. 7 in accordance with an embodiment of the disclosed principles.

FIG. 10 is data plot showing the isolation effect of employing a debar of 44 mm while also using the pin remapping shown in FIG. 7. The first plot 1001 shows the original level of isolation, as in FIG. 9, while the second plot 1003 shows the level of isolation achieved using both the 44 mm debar and pin remapping. Although either innovation is useful by itself, combining these techniques yields an isolation effect that is greater than the sums of the isolation effects using either technique alone. Isolation improvement is upward of 20 dB. It is anticipated that the remapping and debar techniques will be used both by themselves and in combination. Similar isolation improvements are observed at lower or higher frequencies by applying the techniques.

It will be appreciated that a system and method for improved mobile phone isolation for a modular system have been described herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A modular device system including a base portable electronic communication device comprising:
   a chassis;
   a housing at least partially encompassing the chassis, having a display side and a reverse side, and having top, bottom and side edges, wherein one or more antennas are located along one of the top, bottom and side edges;
   a ground element exposed on the reverse side of the housing and being adjacent to the one or more antennas, the ground element being electrically tied to the chassis; and
   a multi-pin connector array on the reverse side and being adjacent to the ground element such that the ground element lies between the connector array and the one or more antennas, the connector array having multiple pins supporting multiple data speeds between and including low speed data and high speed data, wherein the multi-pin connector array has a center and the high speed data pins are located closer to the array center than the low speed data pins, the multi-pin connector array being configured and located to electrically connect to a mating array on a module device when the module device is mated to the base portable electronic communication device.

2. The modular device system in accordance with claim 1, wherein the ground element is an elongated and grounded metal bar on the base device positioned to mate with one or more grounded contacts on the module device when the module device is mated to the base portable electronic communication device.

3. The modular device system in accordance with claim 1, wherein the ground element comprises one or more grounded conductive elements on the base device positioned to mate with one or more grounded conductive elements on the module device when the module device is mated to the base portable electronic communication device.

4. The modular device system in accordance with claim 1, wherein the ground element comprises a line of grounded contacts positioned to mate with an elongated metal bar on the module device when the module device is mated to the base portable electronic communication device.

5. The modular device system in accordance with claim 1, wherein the multi-pin connection array includes multiple pin contacts.

6. The modular device system in accordance with claim 1, wherein the multi-pin connection array includes multiple spring-loaded pins.

7. The modular device system in accordance with claim 1, wherein the base portable electronic communication device further comprises a camera protrusion and at least one alignment feature configured and located such that the multi-pin connection array mates with the mating array on the module device if the module device is docked to the base portable electronic communication device.

8. The modular device system in accordance with claim 1, wherein the one or more antennas are located along one of the top, bottom and side edges of the housing.

9. The modular device system in accordance with claim 1, further comprising a metal plate overlying the multi-pin connector array and having at least one hole there through such that the pins of the multi-pin connector array remain exposed on the reverse side of the housing.

10. The modular device system in accordance with claim 9, wherein there is a gap between the housing of the base portable electronic communication device and the module device when the module device is docked to the base portable electronic communication device, and wherein the grounded metal plate is electrically connected to the chassis and is sized to at least partly fill the gap.

11. A modular device connection system for physically and electrically connecting an electronic module to a portable electronic communication device that includes one or more antennas at an edge thereof, the connection system comprising:
 a ground element adjacent to the one or more antennas, the ground element being grounded to a chassis of the portable electronic communication device; and
 a multi-pin connector array adjacent to the ground element such that the ground element lies between the connector array and the one or more antennas, the connector array having multiple pins supporting multiple data speeds between and including low speed data and high speed data, wherein the multi-pin connector array has a center, and high speed data pins are located closer to the center than the low speed data pins, the multi-pin connector array being configured and located to electrically connect the electronic module to the portable electronic communication device.

12. The modular device connection system in accordance with claim 11, wherein the ground element is an elongated metal bar.

13. The modular device connection system in accordance with claim 11, wherein the ground element comprises a line of grounded contacts.

14. The modular device connection system in accordance with claim 11, wherein the multi-pin connection array one of multiple pin contacts and multiple spring-loaded pins.

15. The modular device connection system in accordance with claim 11, further comprising a camera protrusion and an alignment feature configured and located such that the camera protrusion and the alignment feature together align the portable electronic communication device and the electronic module such that the multi-pin connection array mates with the mating array on the electronic module if the electronic module is mated to the portable electronic communication device.

16. The modular device connection system in accordance with claim 11, wherein the one or more antennas are located along one of the top edge and bottom edge of the portable electronic communication device.

17. The modular device connection system in accordance with claim 11, wherein the one or more antennas are located along one of the side edges of the portable electronic communication device.

18. The modular device connection system in accordance with claim 11, further comprising a metal plate overlying the multi-pin connector array and having at least one hole there through such that the pins of the multi-pin connector array are exposed through the plate.

19. The modular device connection system in accordance with claim 18, wherein the metal plate is electrically connected to the chassis of the portable electronic communication device.

20. A modular electronic device system comprising:
 a portable electronic device having a chassis, a housing at least partially encompassing the chassis and having a display side and a reverse side and having top, bottom and side edges, wherein one or more antennas are located along one of the top, bottom and side edges, a device ground element exposed on the reverse side of the housing adjacent to the one or more antennas, the device ground element being grounded to the chassis, and a device multi-pin connector array on the reverse side adjacent to the device ground element such that the device ground element lies between the device multi-pin connector array and the one or more antennas, the device multi-pin connector array having multiple pins supporting multiple data speeds between and including low speed data and high speed data, the device multi-pin connector array having an array center and having the high speed data pins located closer to the array center than the low speed data pins; and
 an electronic module having a module ground element providing a module ground and a module multi-pin module connector array, wherein the module ground element and the module multi-pin module connector array are configured and located to electrically connect to the device ground element and the device multi-pin connector array respectively when the electronic module is mated to the portable electronic device.

* * * * *